US010926408B1

(12) United States Patent
Vogelsong et al.

(10) Patent No.: US 10,926,408 B1
(45) Date of Patent: Feb. 23, 2021

(54) ARTIFICIAL INTELLIGENCE SYSTEM FOR EFFICIENTLY LEARNING ROBOTIC CONTROL POLICIES

(71) Applicant: Amazon Technologies, Inc., Seattle, WA (US)

(72) Inventors: Michael Vogelsong, Seattle, WA (US); Darren Ernest Canavor, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 637 days.

(21) Appl. No.: 15/870,613

(22) Filed: Jan. 12, 2018

(51) Int. Cl.
*B25J 9/16* (2006.01)

(52) U.S. Cl.
CPC ............ *B25J 9/163* (2013.01); *B25J 9/1671* (2013.01)

(58) Field of Classification Search
CPC ... B25J 9/163; B25J 9/1628; B25J 9/16; B25J 9/1671; Y10S 901/00; Y10S 901/01; Y10S 901/02; Y10S 901/03
See application file for complete search history.

(56) References Cited

U.S. PATENT DOCUMENTS

| 10,766,137 | B1* | 9/2020 | Porter | B25J 9/1697 |
|---|---|---|---|---|
| 10,786,900 | B1* | 9/2020 | Bohez | B25J 9/163 |
| 10,792,810 | B1* | 10/2020 | Beckman | B25J 9/1671 |
| 2018/0222045 | A1* | 8/2018 | Khansari Zadeh | G05B 19/423 |
| 2019/0091859 | A1* | 3/2019 | Wen | B25J 9/163 |
| 2020/0167606 | A1* | 5/2020 | Wohlhart | G06K 9/6262 |

OTHER PUBLICATIONS

Althoefer et al., "Reinforcement Learning in a Rule-Based Navigator for Robotics Manipulators", Neurocomputing, 2001, vol. 37, pp. 51-70.
Baird III, Leemon C., "Reinforcement Learning Though Gradient Descent", Thesis, School of Computer Science, Carnegie Mellon University, May 14, 1999, pp. 78.
Botterill et al., "Speeded-Up Bag-of-Words Algorithm for Robot Localisation through Scene Recognition", In Proceedings of Image and Vision Computing New Zealand, IEEE 2008, pp. 6.
Hager et al., "Robot Feedback Control Based on Stereo Vision: Towards Calibration-Free Hand-Eye Coordination", IEEE, 1994, pp. 2850-2856.
Kehoe et al., "Cloud-Based Robot Grasping with the Google Object Recognition Engine", 2013 IEEE International Conference on Robotics and Automation (ICRA), Karlsruhe, Germany, May 6-10, 2013, pp. 4263-4270.
LeCun et al., "Convolutional Networks and Applications in Vision", IEEE 2010, pp. 253-256.

(Continued)

*Primary Examiner* — Khoi H Tran
*Assistant Examiner* — Tristan J Greiner
(74) *Attorney, Agent, or Firm* — Knobbe, Martens, Olson & Bear, LLP

(57) ABSTRACT

A machine learning system builds and uses control policies for controlling robotic performance of a task. Such control policies may be trained using targeted updates, for example by comparing two trials to identify which represents a greater degree of task success, using this to generate updates from a reinforcement learning system, and weighting the updates based on differences between action vectors of the trials.

21 Claims, 7 Drawing Sheets

(56) References Cited

OTHER PUBLICATIONS

Abbeel et al., "Apprenticeship Learning via Inverse Reinforcement Learning", Appearing in Proceedings of the 21st International Conference on Machine Learning, Banff, Canada, 2004, pp. 8. Available at http://www.cs.stanford.edu/~pabbel.irl/.
Abbeel, Pieter, "Apprenticeship Learning and Reinforcement Learning with Application to Robotic Control", Ph.D. Dissertation, Stanford University, Computer Science, Aug. 2008, pp. 248. Available at http://ai.stanford.edu/~pabbeel/thesis/thesis.pdf.
Christiano et al., "Deep Reinforcement Learning from Human Preferences", Jul. 13, 2017, version 3, pp. 17. Available at http://arxiv.org/abs/1706.03741.
Krizhevsky et al., "ImageNet Classification with Deep Convolutional Neural Networks", Part of: Advances in Neural Information Processing Systems 25 (NIPS 2012), pp. 9. Available at https://papers.nips.cc/paper/4824-imagenet-classification-with-deep-convolutional-neural-networks.pdf.
OpenAI, "Learning from Human Preferences", Jun. 13, 2017, pp. 8. Available at https://blog.openai.com/deep-reinforcement-learning-from-human-preferences/.
OpenAI, "Gathering Human Feedback", Aug. 3, 2017, pp. 4. Available at https://blog.openai.com/gathering_human_feedback/.
Salimans et al., "Evolution Strategies as a Scalable Alternative to Reinforcement Learning", Sep. 7, 2017, version 2, pp. 13.
Kuka Robot Group, "KUKA Robot Bottle Flip Challenge—Machine Learning in Practice", as published Apr. 19, 2017, https://web.archive.org/web/20170419163822/www.youtube.com/watch?v=HkCTRcN8TB0, 1 page.

* cited by examiner

ARTIFICIAL INTELLIGENCE SYSTEM FOR EFFICIENTLY LEARNING ROBOTIC CONTROL POLICIES

BACKGROUND

Artificial intelligence describes computerized systems that can perform tasks typically considered to require human intelligence. The capability to learn is an important aspect of intelligence, as a system without this capability generally cannot become more intelligent from experience. Machine learning is a field of computer science that gives computers the ability to learn without being explicitly programmed, for example enabling artificial intelligence systems to learn complex tasks or adapt to changing environments.

BRIEF DESCRIPTION OF DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1A:
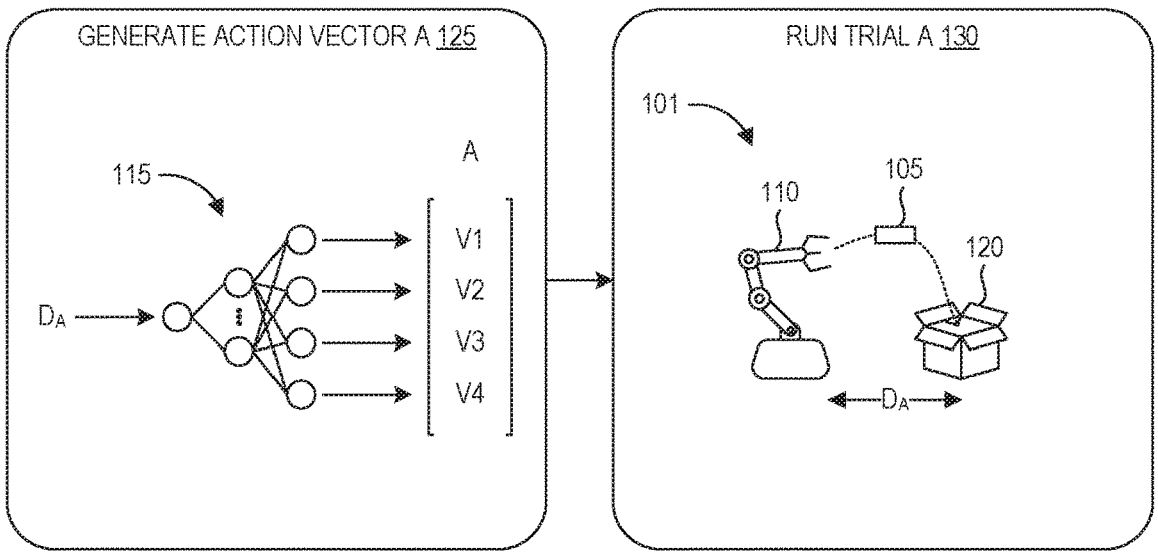
FIGS. 1A and 1B graphically depict an illustrative example of a process for improved efficiency in training a control policy of a robotic system for performing a task.
Figure 1A:
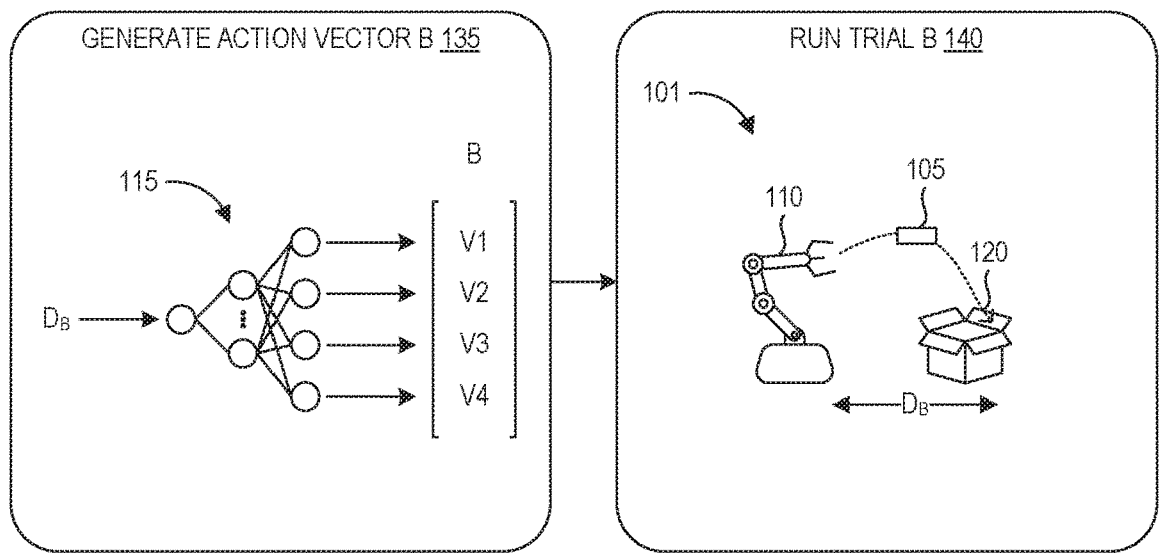

The present disclosure is generally directed to using artificially intelligent machine learning systems to build and use control policies for robotic systems to perform given tasks. For example, a training system can run a number of trials using a current policy, analyze the trials to determine which trials represent similar policy implementations, and select pairs of trials from among the determined similar policy implementations. A pair of trials can be evaluated to determine which trial represents a more successful performance of the goal task, and data representing these trials can be compared to determine where they differ and by how much. This difference information can be leveraged to provide targeted updates to the control policy, where areas of the policy contributing to greater differences between the two trials in the pair can be updated more heavily. Beneficially, this can provide for much more efficient machine learning of high performing control policies compared to techniques that implement conventional reinforcement learning using random updates.

Most control policies for robotics, including autopilots and self-driving automobiles, are hard-coded around mathematical models of the physical systems being controlled. Robotic systems face many challenges as robotic platforms move from laboratory testing into real world applications. In particular, the huge amount of variety encountered in real-world environments can be extremely challenging for existing robotic control algorithms to handle. Typically, a robotics control engineer or team of such engineers would hand-design control policies for each task the robot is to perform. However, for complex tasks (e.g., autonomous driving or flying) and even some non-complex tasks, it can be challenging to hand-code an entire end-to-end robotic control policy. It can also be challenging to scale these approaches up to the huge amount of variety that robots must deal with in the real world when performing the desired tasks. For example, control policies are limited by the ability of engineers to understand every aspect of the system, task, and environment well enough to model it mathematically. The control policies cannot operate outside the envelope of the control laws written explicitly into them. Many control policies are hard-coded, as existing approaches that use machine learning to generate similar control policies require large amounts of time and many trials.

The disclosed systems address the aforementioned problems, among others, by the disclosed machine learning techniques for generating robotic control policies. The techniques can fine-tune policy updates based on comparisons between similar trials. For example, a machine learning system can use k-nearest neighbors algorithm ("k-NN") or a similar technique in order to identify, from among a number of recorded observations of training trials, which trials are similar to one another. Pairs of similar trials can be selected for use in generating policy updates. Pairwise evaluation indicates which trial in a pair is more a successful attempt at performing the goal task. From there, the machine learning system compares vector representations of the observations of the pair of trials (e.g., vector representations of the actions taken as a result of the policy, vector representations of the observations themselves). This comparison identifies where, and by how much, the actions of the robotic system during the more successful trial differ from the actions of the robotic system during the less successful trial. Presumably, it is these differences that contribute to the greater success in the more successful trial, and thus the areas of the policy that cause these differences may be more important to the successful performance of the task than other areas of the policy. A vector representing the differences can be used to weight a vector representing updates to the policy, for example a vector generated by a reinforcement learning system based on the pairwise evaluation of the trials. By identifying and comparing similar trials in this manner, the disclosed machine learning system was able to use targeted policy updates to achieve policy training in around 200 iterations, in comparison to around one million iterations required to train the policy using random (non-targeted) updates.

By using targeted updates to machine-learned policies to control robotic task performance, the present technology is able to achieve levels of robustness, accuracy, and flexibility not available by traditional methods. As an example, a machine learned robotic control policy may yield the capability to perform tasks that a human cannot figure out or imagine, for example an autopilot control policy that can recover from stall. Further, the disclosed targeted updates during policy training enable the disclosed machine learned robotic policies to achieve a greater level of robustness to scenarios outside of the training data, and can train a successful policy using fewer iterations and less time than traditional policy training techniques.

Although aspects of some embodiments described in the disclosure will focus, for the purpose of illustration, on particular examples of training data, tasks, and robotic systems, the examples are illustrative only and are not intended to be limiting. In some embodiments, the techniques described herein may be applied to additional or alternative training data, robotic systems, and tasks. Various aspects of the disclosure will now be described with regard to certain examples and embodiments, which are intended to illustrate but not limit the disclosure.

Overview of Example Machine Learning Techniques

Figure 1B:
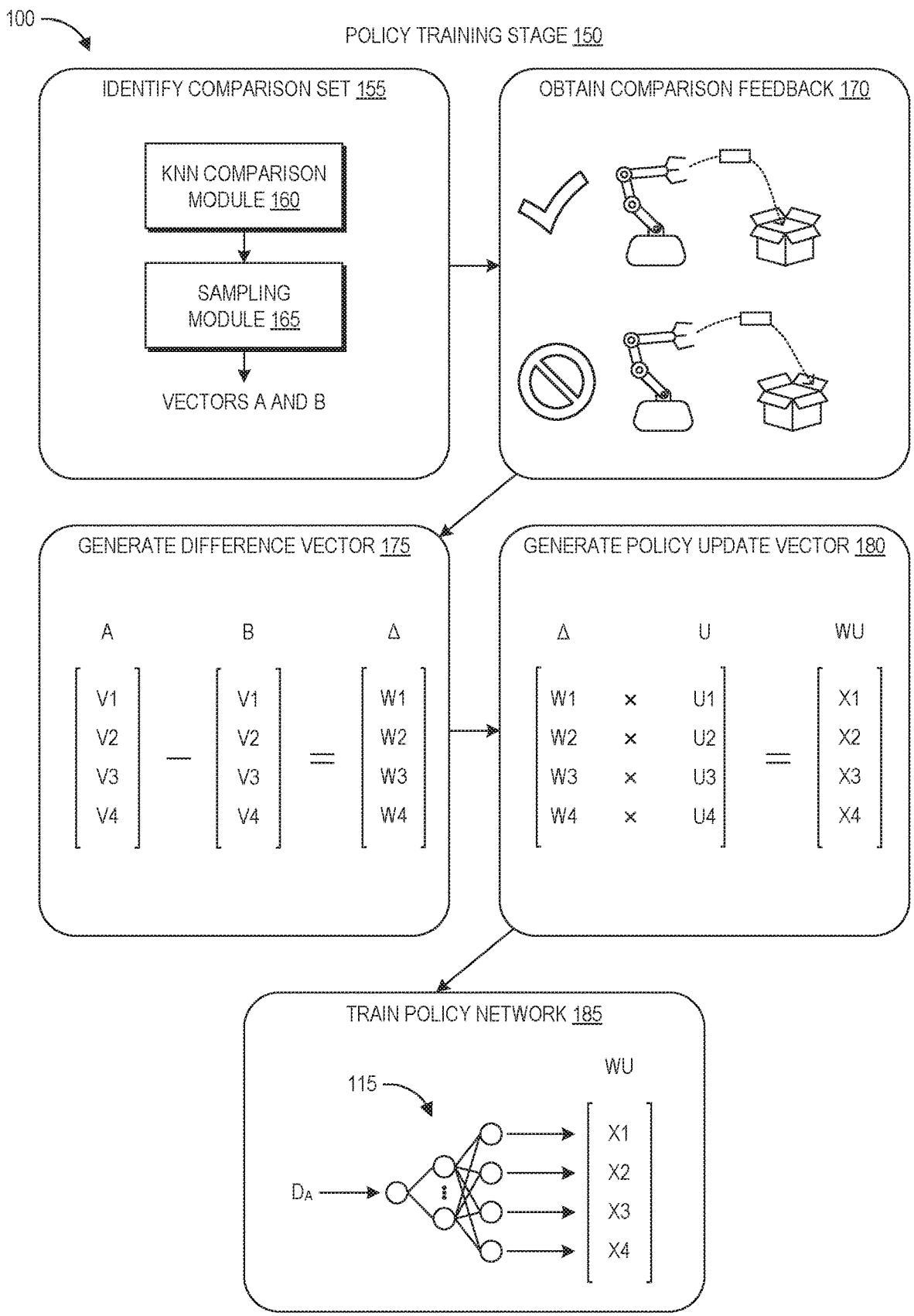

FIGS. 1A and 1B graphically depict an illustrative example of a process 100 for improved efficiency in learning a control policy of a robotic system 110 for performing a task 101. Examples of machine learning systems suitable for implementation of this process are described with reference to FIGS. 2A-3B. The process 100 may begin in response to an event, for example in response to the addition of a new robot and/or task to a robotic control system, or a change in a robot or task, automatically or on demand by a system administrator. When the process 100 is initiated, a set of executable program instructions stored on one or more non-transitory computer-readable media (e.g., hard drive, flash memory, removable media, etc.) may be loaded into memory (e.g., random access memory or "RAM") of computing device. The executable instructions may then be executed by a hardware based computer processor (e.g., a central processing unit or "CPU") of the computing device. In some embodiments, the process 100 or portions thereof may be implemented on a computing system that includes multiple computing devices and/or multiple processors, serially or in parallel.

FIG. 1A depicts the training data gathering stage 145 of the process 100. FIG. 1A depicts an example robot 110 performing an example task 101 of tossing an object 105 into a box 120. A control policy for this task 100 would specify the actions the robot 110 can take to complete the steps needed for completing the task 101. Such an arrangement may, for example, exist in an order fulfillment center in which a robotic system picks up ordered items from storage structures and transfers them to bins or boxes for shipment to customers. Thus, picking up the object 105 represents one task of many potential tasks that the robot 110 may be programmed and configured to perform within such an order fulfillment center.

The robot 110 is guided through the sequence of actions needed to perform the task 100 by its controller. The controller is the hardware that operates to control the robot based on a control policy, for example a control policy learned as described herein. The control policy can be considered as the model or model parameters programmed into the controller, for example as a function that takes in variables representing the current state of the system (the robot, its environment, and any objects) and a specification of the current task, and then outputs a specification of actions the robot should take. Robotic controllers, say for grasping and locomotion, can include action decision making policies, task lists, computer vision, mapping, tracking, and planning.

In order to train the robot 110 to perform the task, the process 100 can begin by gathering training data at stage 145. As illustrated, this stage 145 can include generating an action vector and then running a trial based on that action vector. A fully connected feedforward neural network, the structure and function of which is explained in more detail below, forms the policy network 115. The policy network 115 intakes a distance value, D, representing the distance the robot 110 is being instructed to throw the object 105. While the goal of the task 101 may be to throw the object 105 a distance of four meters, during training the input distance value can vary between numbers in a range around this distance in order to construct a more robust policy. This distance value is passed forward and transformed through the layers of the policy network 115, and the values of the output nodes generate an action vector. In this example, the action vector includes four values V1-V4 representing three joint angles and a time of release. The values of the action vector may be floating point numbers normalized between −1 and +1 that can be converted into a corresponding release time or joint angle value. The number of input and output nodes of the policy network 115 can be varied to accommodate the various numbers of input and output values required for other tasks.

FIG. 1A shows four sub-blocks of the training data gathering stage 145. At block 125, the machine learning system inputs distance value $D_A$ into the policy network 115 to generate action vector A. Initially, the parameters of the policy network 115 may be randomly initialized or initialized based on policy parameter values from a similar task. These parameters may or may not enable to robot 110 to actually throw the object to the desired distance, $D_A$.

At block 130, the controller of the robot 110 runs trial A using the action vector A. The controller of the robot 110 uses the values of the action vector A to determine a release time and angles of the three robotic joints at the release time. The release time may represent the amount of time the robot should take to move from a previous state into the state represented by the three joint angle values, as well as representing the time at which the robot should release its grip on the object 105. The controller causes the robot 110 to attempt to throw the object to the desired distance, $D_A$, using the action vector A.

At block 135, the machine learning system inputs distance value $D_B$ into the policy network 115 to generate action vector B. The parameters of the policy network 115 remain unchanged between trial A and trial B, however the input task target varies. Although only two trials (A and B) are illustrated, the training data gathering stage 145 can run any number of trials using the same instance of the policy 115 in order to generate a desired training data set size, for example thirty or forty trials in some embodiments.

At step 140, the controller of the robot 110 runs trial B using action vector B. The controller of the robot 110 uses the values of the action vector B to determine a release time and angles of the three robotic joints at the release time, and causes the robot 110 to attempt to throw the object to the desired distance, $D_B$, based on these parameters. In the illustrated example, throwing the object 105 the desired distance $D_A$ would cause the object 105 to land inside the box 120, while throwing the object 105 the desired distance $D_B$ would cause the object 105 to hit the far edge of the box 120. In this manner, the training process 100 tests a number of potential distances that may allow the robot 110 to achieve success at the task 101, rather than just training a policy to throw at a target distance to the center of the box. This can create a more robust policy for handling varying throwing scenarios during robotic deployment. Various embodiments of the training process 100 can vary the proximity of this tested range to the goal behavior as needed to generate a robust policy.

FIG. 1B depicts the policy training stage 150 of the process 100. This stage 150 is used to update the parameters of the policy to optimize the policy 115 for successful performance by the robot 110 of the task 101. As used herein, optimizing a policy refers to tuning its parameters to produce increasing levels of success at a given task until a desired performance metric is reached, which may or may not yield an empirically optimal policy.

At block 155, the machine learning system identifies a comparison set. In this example, the comparison set is a pair of action vectors generated by the same instance of the policy network 115. This can include using k-NN to identify similar vectors among the set of action vectors generated during the training data gathering stage 145. For example, action vector A can be identified as the first action vector in the pair. For the first iteration of block 155, action vector A may be selected because trial A was conducted first, selected at random, or selected because trial A was labeled as the most successful trial. For subsequent iterations of block 155, action vector A may be selected because trial A was favored in the comparison feedback performed at block 170.

After the action vector A is chosen as the first vector, the k-NN comparison module 160 can use a k-NN algorithm to identify a second vector to form a pair with action vector A. This can include placing the action vectors in a feature space and identifying a certain number or percentage (e.g., 10% or 20%) of the nearest neighbors to action vector A. These nearest neighbors form a pool of candidates that can be paired with action vector A. The sampling module 165 can randomly sample from this pool to generate the pair of the comparison set, which in this example are action vectors A and B. In further iterations of the policy training stage 150, the sampling module 165 can continue drawing on this pool until there are no candidates remaining or until a new action vector is identified as the first vector. If a new action vector is identified, the k-NN comparison module can identify a new candidate pool of nearest neighbors, optionally excluding any action vectors that have already been compared to the new action vector.

At block 170, the machine learning system obtains pairwise comparison feedback regarding the trials corresponding to the selected action vectors. The feedback can be provided by a human user evaluating the pair, or by a trained machine learning classifier. In the illustrated example, trial A is identified at block 170 as representing a more successful performance of the task 101 than trial B.

At block 175, the machine learning system generates a difference vector by subtracting action vector B from action vector A. This yields a difference vector Δ, which represents the areas where action vector A differs from action vector B, as well as the magnitude of the difference. To illustrate, if V1 represents the release time, with this time being 2 seconds in action vector A and 1 second in action vector B, then W1 would have a value of 1. If the release times were the same, then W1 would have a value of zero. As such, the difference vector Δ identifies where and by how much action vector A differs from action vector B. Because trial A was selected over trial B in the pairwise comparison at block 170, these differences reflect candidate areas of the policy that caused the greater success in the task performance. The values W1-W4 of the difference vector Δ may be weighted based on the difference between the distance $D_A$ and the target distance of the task, for example reflected in the reinforcement learning update, such that the values become smaller the further $D_A$ is from the target distance of the task.

At block 180, the machine learning system obtains update values U1-U4 representing new desired values of the action vector A. As explained in more detail below, these values can be determined based on reinforcement learning. The values U1-U4 can be weighted by corresponding ones of the values W1-W4 to generate a weighted update vector WU having values X1-X4. This reflects the reinforcement learning updates weighted based on the actual differences between action vectors A and B.

At block 185, the machine learning system can use the weighted update vector WU to update the expected output of the policy 115. The machine learning system can then update the weights of the policy network 115 so that the output of the network matches the new expected value. In this manner, the disclosed training techniques achieve targeted updates to the policy, where these updates are targeted both by location and magnitude. As described above, the targeted updates can involve analyzing a batch of training episodes (e.g., distinct task performances based on the same policy iteration). In some embodiments, the batch size can be set to one such that each time the policy is updated, one or more new episodes are performed based on this new iteration of the policy, and then a single policy update is performed to generate the next iteration of the policy. This "online version" of the training beneficially occurs quickly, however each update may make a large jump that overfits the network parameters to the single training example. This may result in a policy that is less generalizable to situations outside of the training examples. Another embodiment can have the batch size set to two or more (up to the number of episodes in a batch, for example ten, twenty, thirty, or more). In this embodiment, the disclosed techniques can look at x number of training episodes (where batch size=x) and calculate updates to the policy network over the entire x number of training episodes. At this point, the updated network is used as the next iteration to generate data regarding additional training episodes, and the batch update process is repeated. This may take longer than the "online version" of batch size=1, however it may produce less noisy estimates and generate a policy that is more generalizable to situations outside of the training examples.

Although FIGS. 1A and 1B are discussed in the context of action vector similarity determinations and pairwise comparisons, other examples can use data representing recorded observations of task performance instead (e.g., videos, sound recordings). These may be converted into vector form with components mapped to the output nodes of the policy network 115.

FIGS. 1A and 1B depict throwing an object as one example of a robotically-performed task for which a control policy can be generated using machine learning techniques as described herein. This example is provided to illustrate and not limit the disclosed machine learning techniques. Other example real-world tasks include SLAM (simultaneous location and mapping), transferring physical objects to and from storage structures, stowing objects in semi-rigid or soft containers, moving objects onto conveyor belts, item manipulation, autonomous movement through static or dynamic environments such as warehouses, autonomous flying, autonomous driving of an automobile, lifting objects, forklift manipulation, tractor-trailer attach and detach, shunting yard control (e.g., assembling trains, packing cargo containers), and flipping a bottle. As another example, the disclosed techniques can be used to generate control policies for robots that perform, or assist in the performance of, surgical procedures. In some implementations, the disclosed techniques may be particularly useful for generating control policies for tasks that humans find difficult, as the control policies for such tasks may be particularly challenging to write by hand.

As used herein, a "task" refers to a physical process in which a robotic system (or a portion thereof) is physically moved under control of a control policy in order to interact with one or more physical objects. During certain portions of the disclosed control policy training, such a task may be performed virtually (e.g., using a simulation of the robotic kinematics and environment to computationally model physical interaction between the robot and an object) or physically in the real world (e.g., by a hardware controller physically moving the robot based on the control policy). Thus, the disclosed trials or episodes testing robotic success at task performance during control policy training can refer to either physical or virtual performances of the task, while instances of robotic task performance using a finalized control policy involve physical performance of the task in the real world.

Overview of Example Machine Learning Systems

Figure 2A:
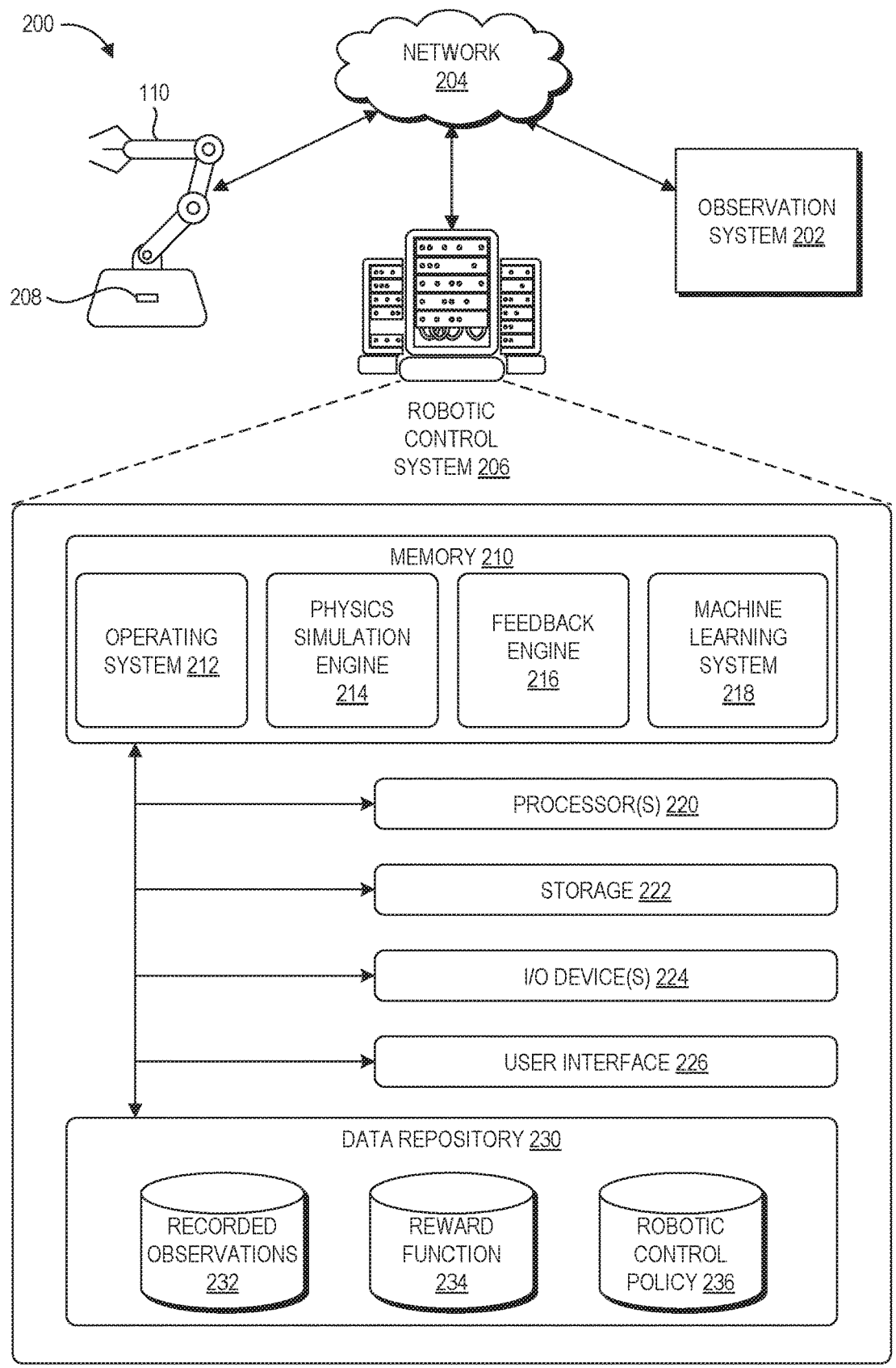
FIG. 2A is a block diagram of an illustrative computing system configured to implement a machine learning system for robotic control, for example using the policy training technique represented by FIGS. 1A and 1B.

FIG. 2A is a block diagram of an illustrative computing system configured to implement a machine learning system for robotic control, for example using the policy training technique represented by FIGS. 1A and 1B. As illustrated, the computing system 200 includes the robotic system 110, an observation system 202, and the robotic control system 206 configured to communicate data with one another via a network 204.

The robotic system 110 can be a robot having a number of linkages coupled by a number of joints (motorized or passive) and one or more end effectors configured to interact with the robot's environment. Another example of a robot can include mechanisms for moving the robot about its environment, for example wheels or legs driven by computer-controlled motors, pneumatic systems, or jet propulsion systems (e.g., for aerial robots). The robotic system 110 can also include one or more sensors configured to perceive its environment, for example sensors suitable for perceiving visual, audible, or other sensory parameters of the environment, or for example sensors suitable for perceiving electromagnetic signals emitted from objects within the environment. The structure and sensors of the robotic system 110 can be selected or designed for performance of a particular task or set of tasks, for example warehouse inventory management, aerial package delivery, or surgical procedures, to name a few examples. The robotic system 110 also includes controller 208 for controlling the robotic system 110 based on a trained policy. The controller 208 includes one or more physical data storage devices that store the control policy, data representing task specifications, and other executable instructions for controlling the robotic system 110. As well, the controller 208 includes one or more processors programmed by the instructions to implement robotic control. The controller 208 can receive data from the robot's sensors and can use this data in conjunction with the control policy to determine the sequence of actions taken by the robotic system 110.

The observation system 202 includes one or more sensors positioned and configured to observe the robotic system 110 as it performs its tasks in a real-world environment. Suitable sensors include image sensors (e.g., cameras), microphones, and electromagnetic position sensors, to name a few examples. The observation system 202 can generate still images, videos, audio recordings, and/or positional tracking data representing the robotic system 110 performing a task (or representing the target objects of the task). The observation system 202 may be integrated into the robotic system 110, may be a separate structure that is mobile and configured follow the robotic system 110 as it moves about its environment, and/or may include one or more stationary sensors. In simulation-based training, the observation system 202 can be a recording module for recording data representing a simulated trial, for example a video of the simulation.

The robotic control system 206 includes at least one memory 210 and one or more processing units (or processor(s)) 220. The memory 210 may include more than one memory and may be distributed throughout the robotic control system 206. The memory 210 may store program instructions that are loadable and executable on the processor(s) 220 as well as data generated during the execution of these programs. Depending on the configuration and type of memory, the memory 210 may be volatile (such as random access memory ("RAM")) and/or non-volatile (such as read-only memory ("ROM"), flash memory, or other memory). In some examples, the memory 210 may include multiple different types of memory, such as static random access memory ("SRAM"), dynamic random access memory ("DRAM"), or ROM.

The memory 210 can store the program instructions as a number of modules that configure processor(s) 220 to perform the various functions described herein, for example operating system 212 for interacting with the computing system 200, as well as the physics simulation engine 214, feedback engine 214, and machine learning system 218. The configuration of the physics simulation engine 214 is described in more detail with respect to FIGS. 3A and 3B, and the configuration of the feedback engine 214, and machine learning system 218 are discussed in more detail with respect to FIG. 2B. The physics simulation engine 214, feedback engine 214, and machine learning system 218 can be in direct communication with one another or distributed among computing devices within a networked computing system and in communication with each other. Components used for the architecture may depend at least in part upon the type of network and/or environment selected.

The processor 220 may include one or more general purpose computers, dedicated microprocessors, graphics processors, or other processing devices capable of communicating electronic information. Examples of the processor 220 include one or more application-specific integrated circuits ("ASICs"), graphical processing units ("GPUs"), field programmable gate arrays ("FPGAs"), digital signal processors ("DSPs") and any other suitable specific or general purpose processors. The processor 220 may be implemented as appropriate in hardware, firmware, or combinations thereof with computer-executable instructions and/or software. Computer-executable instructions and software may include computer-executable or machine-executable instructions written in any suitable programming language to perform the various functions described.

In some examples, the robotic control system 206 may also include additional storage 222, which may include removable storage and/or non-removable storage. The additional storage 222 may include, but is not limited to, magnetic storage, optical disks, and/or solid-state storage. The disk drives and their associated computer-readable media may provide non-volatile storage of computer-readable instructions, data structures, program modules, and other data for the computing devices. The memory 210 and the additional storage 222, both removable and non-removable, are examples of computer-readable storage media. For example, computer-readable storage media may include volatile or non-volatile, removable, or non-removable media implemented in any suitable method or technology for storage of information such as computer-readable instructions, data structures, program modules, or other data. As used herein, modules, engines, and components, may refer to programming modules executed by computing systems (e.g., processors) that are part of the architecture.

The robotic control system 206 may also include input/output (I/O) device(s) and/or ports 224, such as for enabling connection with a keyboard, a mouse, a pen, a voice input device, a touch input device, a display, speakers, a printer, or other I/O device. The robotic control system 206 may also include a user interface 226. The user interface 226 may be utilized by a user to access portions of the interactive computing system. In some examples, the user interface 226 may include a graphical user interface, web-based applications, programmatic interfaces such as application programming interfaces (APIs), or other user interface configurations. The user interface 226 can include displays of the feedback provision user interfaces described herein. In some embodiments, the I/O device(s) and/or ports 224 and user interface 226 can be part of a user computing device accessing robotic control system 206 via network 204.

The robotic control system 206 also includes a data store 230. In some examples, the data store 230 may include one or more data stores, databases, data structures, or the like for storing and/or retaining information associated with the computing system 200. Thus, the data store 230 may include data structures, such as recorded observations data repository 232, reward function data repository 234, and robotic control policy data repository 236. The recorded observations data repository 232 can store data representing recorded task performance trials. Recorded observations can include audio signals, still images, video images sequences, electromagnetic tracking data, and textual information, depending upon the nature of a particular task. Recorded observations can additionally or alternatively include data from sensors on the robot or the target object of the task, for example data from strain gauges, torque sensors (e.g., back EMF sensors), inertial sensors (e.g., gyroscopes, accelerometers), optical sensors, radio frequency sensors, magnetic wave detectors, haptic sensors, air pressure sensors, and piezoelectric sensors.

The reward function data repository 234 can store a reward function or other function suitable for programmatic evaluation of task performance success. This function can be used to guide policy updates via reinforcement learning. Reinforcement learning is an area of machine learning that seeks to learn how to make decisions in order to maximize rewards or minimize costs over a period of time. To generate a control policy via reinforcement learning, the robotic system takes actions to attempt to perform the task, and then a value called a "reward" is provided to the reinforcement learning system. This reward indicates the quality of task performance but does not tell the reinforcement learning system what the correct decisions or actions would have been. Through exploration (e.g., searching for new options) and exploitation (e.g., refining existing options that have resulted in desired rewards), the reinforcement learning system can learn the control policy that maximizes the accumulated sum of rewards over time. The reward is typically determined by a reward function. The reward function can be considered as a model of the goal of the tasks and may be expressed as weighted factors that influence success at task performance.

The robotic control policy data repository 236 stores the parameters of the policy network 115. In other embodiments, the robotic control policy data repository 236 stores data representing other forms of control policies, for example Markov decision processes ("MDPs"). With respect to the policy network 115, artificial neural networks are artificial in the sense that they are computational entities, inspired by biological neural networks but modified for implementation by computing devices. Artificial neural networks are used to model complex relationships between inputs and outputs or to find patterns in data, where the dependency between the inputs and the outputs cannot be easily ascertained. A neural network typically includes an input layer, one or more intermediate ("hidden") layers, and an output layer, with each layer including a number of nodes. A neural network is considered "deep" when it includes two or more hidden layers. The nodes in each layer connect to some or all nodes in the subsequent layer and the weights of these connections are typically learnt from data during the training process, for example through backpropagation in which the network parameters are tuned to produce expected outputs given corresponding inputs in labeled training data, or through evolution strategies. Thus, an artificial neural network (e.g., policy network 115) is an adaptive system that is configured to change its structure (e.g., the connection configuration and/or weights) based on information that flows through the network during training, and the weights of the hidden layers can be considered as an encoding of meaningful patterns in the data.

With respect to control policies, the policy network 115 can receive input of a number of environmental and task-related parameters including an identification of the desired task to be performed, data from the robot's sensors, and robotic position data, to name a few examples. The neural network can be trained to generate an output based on these inputs, with the output representing an action or sequence of actions that the robot should take to accomplish its objective. For example, particular actions may be mapped to particular ones of the output nodes. In use, the selection of an action can occur by processing the inputs through the parameters of the neural network to generate a value at the output node designating that action as the desired action. This action may then be translated into a machine-readable instruction language that causes the robot to perform the action.

The robotic control system 206 can communicate over network 204 with robotic system 110, observation system 202, and any user devices involved in the machine learning processes described herein. In some embodiments, the robotic control system 206 (or a portion thereof, for example including robotic controller 208 programmed with a trained control policy) can be included in the robotic system 110. The network 204 can include any appropriate network, including an intranet, the Internet, a cellular network, a local area network or any other such network or combination thereof. For example, network 204 may be a publicly accessible network of linked networks, possibly operated by various distinct parties, such as the Internet. In other embodiments, the network 204 may include a private network, personal area network, local area network, wide area network, cable network, satellite network, cellular telephone network, etc. or a combination thereof, some or all of which may or may not have access to and/or from the Internet. Other devices may access the network 204 to interact with one or more of robotic system 110, observation system 202, and robotic control system 206, for example user computing devices of users providing input into the machine learning classifier training process.

Figure 2B:
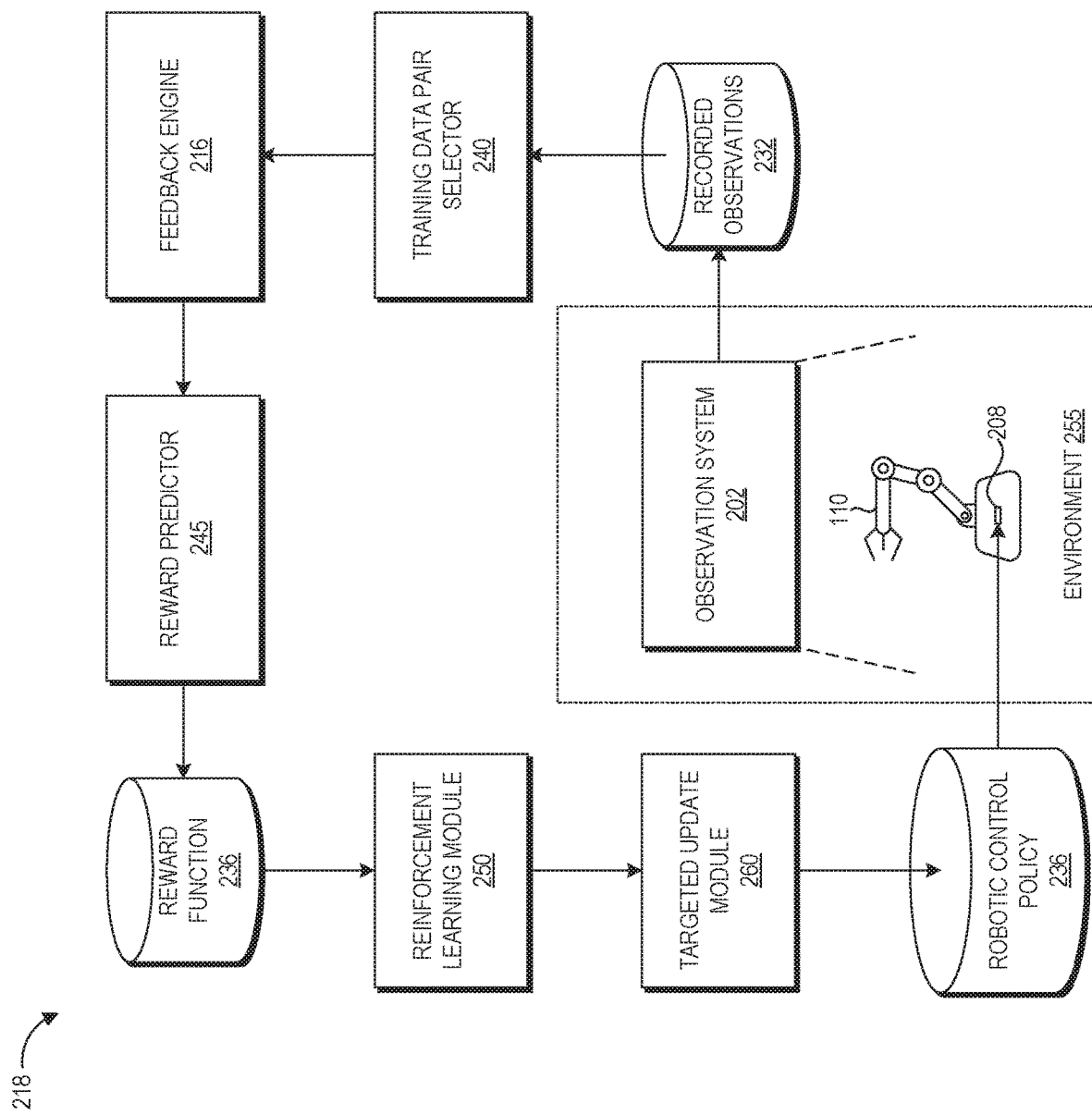
FIG. 2B is a schematic diagram of illustrative components and data flow within the computing system of FIG. 2A, according to some embodiments.

With reference to an illustrative embodiment, FIG. 2B shows a schematic diagram of illustrative data flow between the components of the computing system 200. This data flow and the depicted components (with the exception of those in the environment 255) can be considered as the machine learning system 218.

The training data pair selector 240 can implement the block 155 of FIG. 1B described above, and can include the k-NN comparison module 160 and sampling module 165.

The training data pair selector 240 can receive data representing the recorded observations 232, can identify similar vectors representing or associated with particular trials of the recorded observations, and can select pairs of the trials for pairwise comparison.

The feedback engine 214 can be configured in some implementations to elicit or receive feedback from a human observer on virtual or real-world performance trials, for example by outputting a suitable user interface and identifying feedback provided through the interface. This feedback may be an "AB comparison" preference where the human indicates which of two performances of the task was more successful, as depicted in block 170 of FIG. 1B. Alternatively, the feedback can be a performance score, a binary "succeeded/failed" indication, or other appropriate metrics for indicating the level of success of a particular task performance.

In some implementations, the feedback engine 214 can be a machine learning classifier trained to programmatically evaluate the level of task success represented in a particular virtual trial representation or recorded observation provided to the classifier. Suitable examples include artificial neural networks (including deep neural networks, convolutional neural networks, and recurrent neural networks), capsule networks, Generative Adversarial Networks ("GANs"), decision trees, random forests, support vector machines, and logistic regression, depending upon the nature of the particular task. Such machine learning classifiers can be trained using supervised training (e.g., provided with labeled data of task performance examples that are successful, not successful, or on a spectrum between successful and not successful) or unsupervised training (e.g., clustering based methods for identifying, from a corpus of recorded observations, task performance examples that are successful, not successful, or on a spectrum between successful and not successful). The machine learning classifier can operate directly on recorded observation data (e.g., pixel values in images or videos of task performance) or utilize vector representations of the recorded observation data. The machine learning classifier can generate scores representing the level of success of the task, can generate a binary indication representing task success or failure, or can output comparison preferences for comparing two or more recorded observations of task performance.

The output of the feedback engine 216 can be provided to the reward predictor 245 in some embodiments. The reward predictor 245 is a machine learning module configured to shape the reward function 236. In other embodiments, the reward predictor can be omitted, and the reward function 236 can either be hand-coded or learned and then finalized for use in the policy training. The reward predictor 245 can be a machine learning model, for example a Bayesian model that fits the reward function 236 to the feedback from the feedback engine 216 using Bayesian inference. Another example of a suitable machine learning architecture for the reward predictor 245 is a deep artificial neural network. The reward function data repository 236 stores the reward function output from the reward predictor 245, both during learning iterations and in its finalized form.

The reinforcement learning module 250 can be configured to optimize the policy for a particular task based on reward values output from the reward function 236. The goal of the reinforcement learning module 250 can be to maximize the accumulated reward over time (e.g., over the course of a performance of the task) based on learning the actions or action sequences that produce the optimal policy. The reinforcement learning module 250 can generate update vectors representing updated expected output values for the policy network 115 given a reward determined by the reward function 236.

The targeted update module 260 can implement blocks 175, 180, and 185 of FIG. 1B in order to provide targeted updates to the policy network 115. As described above, the targeted update module 260 can weight update values from the reinforcement learning module based on differences between action vectors. The control policy data repository 246 stores the policy output from the policy generator 238, both during learning iterations and in its finalized form.

The control policy can be provided to the controller 208 of the robotic system 110, which can act based on that policy and be observed by the observation system 202. This data, in turn, can be provided to the recorded observations data repository 232 for use in further training iterations.

Complex or multi-task control applications, for example autonomous robot navigation and robotic object manipulation, may require simultaneous implementation of a broad range of learning tasks including recognition and navigation of the surrounding environment, motion control, object recognition, object manipulation, and other tasks. In order to handle these tasks simultaneously, individual tasks can be implemented using separate policies or a generalized probabilistic control model configured to simultaneously handle various learning tasks. The machine learning system 218 can be configured to generate such separate task-specific policies or a generalized probabilistic model, depending upon the desired control system.

Figure 3A:
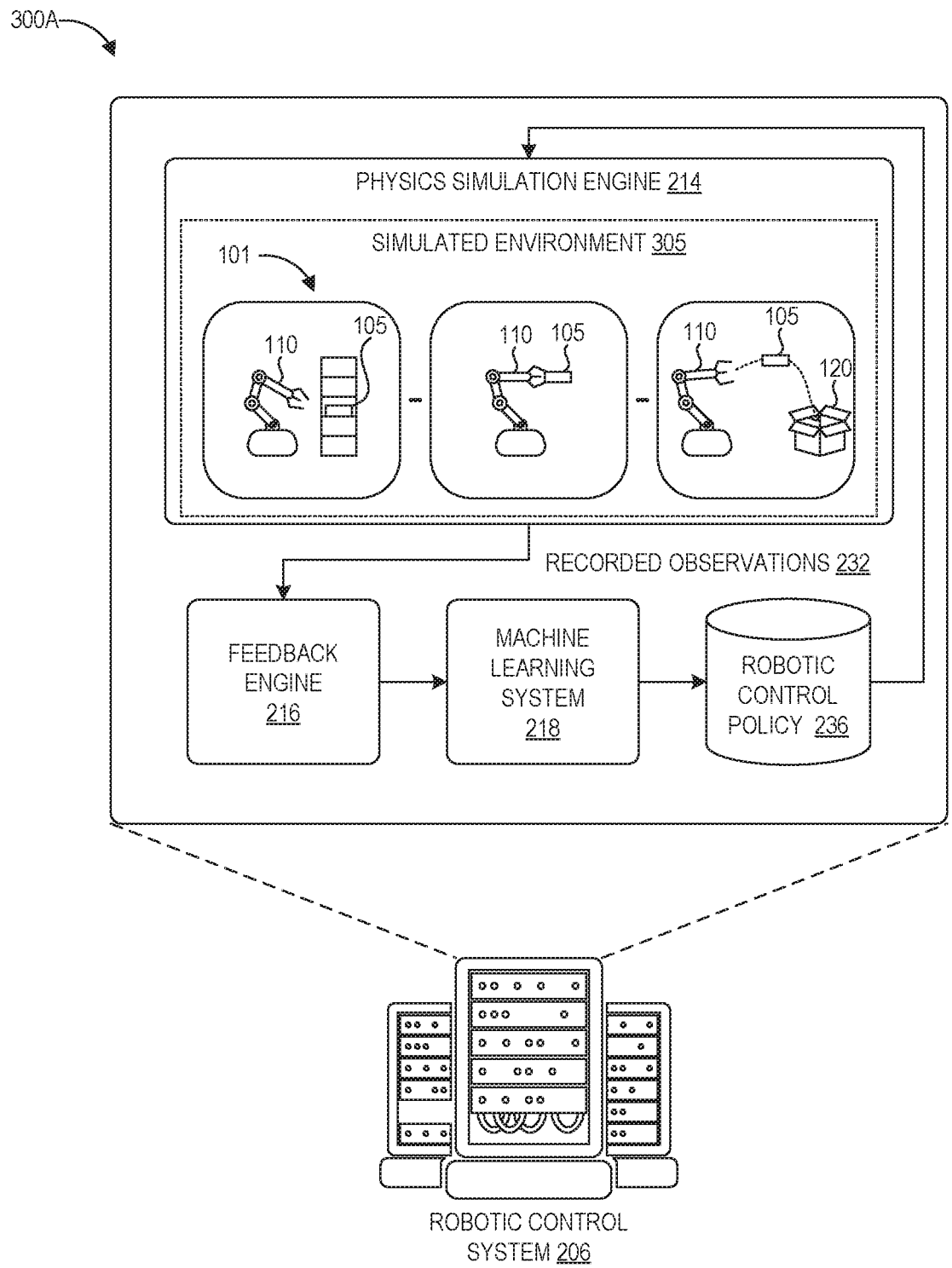
FIGS. 3A and 3B depict graphical representations of example stages of control policy training using the computing system of FIGS. 2A and 2B.
Figure 3B:
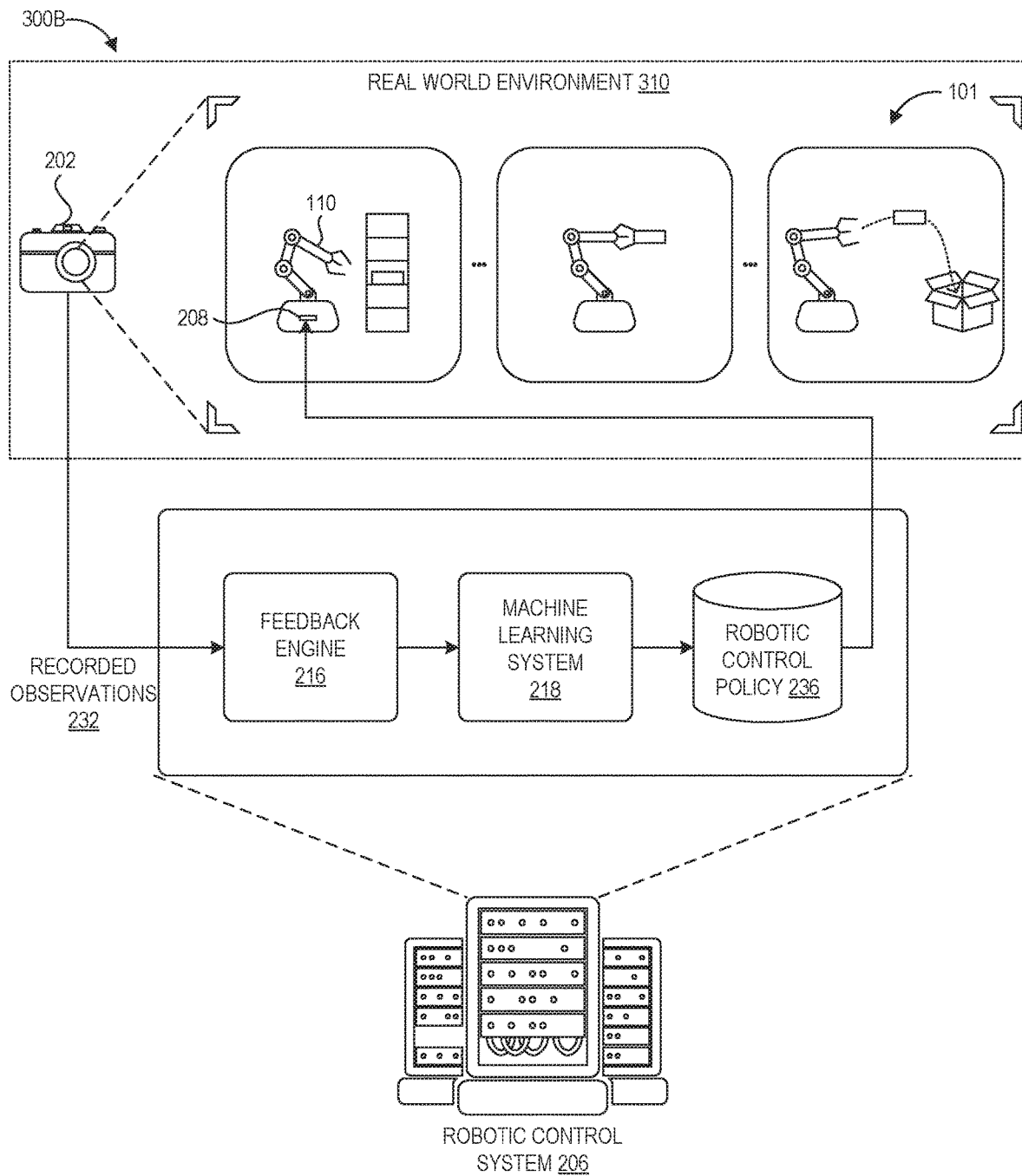

FIGS. 3A and 3B depict graphical representations of example stages of control policy training using the computing system of FIGS. 2A and 2B. FIG. 3A depicts a graphical representation of a virtual phase 300A of the training technique as implemented by a robotic control system 206 including a physics simulation engine 214, feedback engine 214, machine learning system 218, and control policy 236.

The virtual phase 300A of the training technique involves physics simulation engine 214 running simulations of the robotic system performing the task 101 in a simulated environment 305. The real-world environment in the example of FIGS. 1A-1B includes the robot 110 itself, the object 105, the box 120, and any physical conditions of the environment. FIG. 3A depicts the robot 110 stepping through multiple actions for the task 101 in the simulated environment 305, including picking the object 105 up from a storage unit, grasping the object 105 while changing position, and throwing the object 105 into the box 120.

The simulated environment 305 approximates the real-world environment in which the robotic system 110 will perform the task 101. The simulated environment 305 represents a comprehensive, high-fidelity simulation of the scenarios and tasks involved, including any objects being manipulated, the robot performing the manipulation, the environment in which the objects and robot exist, sensors that furnish inputs (e.g., cameras, microphones, radar, lidar, joint-position sensors, strain gauges, barometers, airspeed sensors, thermometers, and hygrometers), and sensor noise from the environment (e.g., smoke, haze, glare, wind, vibration). The robot kinematics may be known with a high degree of precision from its manufacturing specifications and/or calibration test data, however the physical characteristics of other components of the environment can be unknown, variable, and/or complex.

As such, while maintaining high fidelity to the real world environment, the simulated environment 305 may be physically less complex (e.g., model fewer physical parameters) than the corresponding real world environment. To illustrate, in the real world the target object 105 may have unevenly distributed weight, or may be filled with liquid that moves and changes the weight distribution of the object. There may be air currents that affects the trajectory of the object 105 as it is thrown into the box 120. There may be a complex model of the friction within the box 120. However, the simulated environment can instead model the object as having a static and evenly distributed weight, can model the environment without air currents, and can model the box using a simple friction model (or as just a boundary of the location of the opening into the box). This can make the simulation less computationally expensive to run, and may also provide the benefit of generalizing the control policy to a range of possible physical conditions. Further, this avoids the time and computing resources that may be required to measure a large number of real-world parameters.

The virtual phase 200A of the training technique involves physics simulation engine 214 running simulations of the robotic system performing the task 101 in the simulated environment 305. Prior to initiation of training, the physics simulation engine 214 defines the parameters and objects of the simulated environment 305. This can be done programmatically, via a user manually setting up the simulated environment 305, or a combination. The physics simulation engine 214 can be configured to output a visual representation of task simulations to a user interface of a display. This can be used together with the feedback engine 214 to elicit user feedback on the success of virtual task performances. The physics simulation engine 214 can be additionally or alternatively configured to record events occurring within the simulated environment 305 and send this data to the feedback engine 214, where it may be programmatically evaluated by a machine learning classifier as described herein.

Recordings of these simulated trials are provided to the feedback engine 214, which generates success/reward scores or outputs comparison preferences indicating which of a number of performances was more successful. This can involve human judgment or can be automated. The evaluation from the feedback engine 214 guides the machine learning system 218 to generate and refine a robotic control policy for the task. The robotic control policy 236 is stored and then used during the next simulation of the task 101 in the simulated environment 230. The robotic control system 206 can repeat this loop until the robotic control policy 236 achieves the desired performance level within the simulated environment 230. The machine learning system 218 can implement the targeted update process 100 of FIGS. 1A and 1B using recorded observations 232 of simulated trials to iteratively update the policy until it achieves satisfactory performance in the simulated environment 305, for example consistent success at the task goal.

FIG. 3B depicts a graphical representation of a real-world refinement phase 300B of the disclosed training technique as implemented by the robotic control system 206 operating together with the robotic system 110 and an observation system 202 in the real-world environment 310. After completion of the virtual phase 300A of the training technique as shown in FIG. 2A, the robotic control system 206 provides the robotic control policy 236 to the controller 208 of the robotic system 110 to control the robotic system 110 while performing trials of the task 101 in the real world environment 310.

The robotic system 110 can be observed in some embodiments by the observation system 202, which provides its recorded observations to the feedback engine 214. In some embodiments a human engineer can directly observe the robotic system 110 and input evaluations into a user interface of the feedback engine 214, and thus the observation system 202 may be omitted. These evaluations by the feedback engine 214 are used by the machine learning system 218 to refine the robotic controller that was previously trained in the simulated environment 305.

Although FIG. 3B does not illustrate the physics simulation engine 214 for purposes of simplicity of FIG. 3B, it will be appreciated that the robotic control system 206 may still include this component during execution of the real-world refinement phase 300B. Further, in some embodiments the robotic control system 206 may return to the virtual phase A after commencing the real-world refinement phase B, for example to refine the control policy in the simulated environment 230 using updated physical parameters before again returning to the real-world refinement phase B, or to implement curriculum learning (e.g., to learn different policies used sequentially in the task 101).

During control policy generation, the robotic control system 206 can operate as the machine learning training system that generates the robotic control policy. During both real-world training and implementation, the controller 208 can provide programmatic control of the robotic system 110, for example by maintaining robotic position data, determining a sequence of actions needed to perform tasks based on a current iteration of the control policy, and causing actuation of the various components of the robotic system 110. The robotic control system 206 is illustrated graphically as a server system, and the server system can be configured to control (via a network) a number of remote robotic systems that are the same or different from one another that are performing the same task or different tasks. In other embodiments, the robotic control system 206 can instead be integrated into the robotic system 110. As such, the robotic control system 206 may include one or more computers, perhaps arranged in a cluster of servers or as a server farm. The memory and processors that make up these computers may be located within one computer or distributed throughout many computers (including computers that are remote from one another) as detailed herein. These servers may be configured to generate and implement robotic control policies.

Policy Learning Examples

The inventors of the present disclosure have conducted learning of robotic control policies using the presently disclosed techniques. Some of these training sessions are described as examples here for purposes of illustrating the benefits of the presently disclosed techniques. As will be appreciated, these training sessions represent real policy training conducted by the robotic control system 206.

In one example, the inventors taught an industrial robotic arm to flip and land a partially-filled water bottle (e.g., land the bottle upright)—without ever explicitly modeling fluid dynamics in the bottle or idiosyncrasies of the environment dynamics. In the virtual phase A, the inventors trained the system in a simulator environment. On average, it took between 15-20 episodes (attempted throws) to learn a bottle flip that lands, using 4 degrees of freedom of control on the simulated robotic arm. One of the main advantages of this approach is that the training efficiency remained strong across a variety of target behaviors (as long as they are within the physical limitations of the robot). For example, the inventors could direct the robot to do short 1 meter flips, long 4 meter flips, or sliding "shuffleboard-type" throws. The inventors were able to train all of these behaviors in a similar 20-episode average duration. It is noteworthy that this training efficiency was similar when the inventors tried experiments on the real robot. When the robot was limited to fewer degrees of freedom, the inventors were able to train a successful bottle flip on a real robot in around 3 minutes wall-clock time. As an extension, the inventors were able to train a flip with a high level of water in the bottle, pour out some of that water (without measuring or inputting this information into the training system), and then fine-tune the control policy to work with the new water level in 3 minutes.

Another development was to try to learn a single robotic control policy that could throw the simulated bottle to many distances between 1 meter and 4 meters—a "generalized" policy. After 200 training episodes (200 episodes at 12 seconds each=1.3 hours of training), the policy was able throw to desired distances between 1 meter and 4 meters within about +/−0.3 meter deviation (e.g when instructed "throw to 2.7 meters," the robot would throw to somewhere between 2.4 and 3.0 meters). The bottle did not land upright every time—the sample estimate was 60% landing. However, the policy was able to learn underlying structure, and generalize outside its training set. For example, when given negative distances (e.g., an instruction to throw backward) or distances larger than 4 meters, the simulated robot would attempt to throw backwards or longer, respectively.

Third, the inventors were able to take the policy learned in simulation, deploy it on the real robot (without further training), and the robot retained approximate mapping of distances in the real world (but not successful landings). Using the long flip as an example, the inventors then fine-tuned the simulated policy to the real robot with 14 training episodes to land a 3.5 meter flip in the real-world environment.

Below is a more detailed description of the methodology used in these example training sessions. As will be apparent, many of the parameters and other implementation details used by the inventors in these experiments can be varied widely. The overall goal was to develop a method for learning complex robotic control. This overall goal can be broken down into the following sub-goals: (A) strong performance on single robotic tasks; (B) good generalization to new robotic tasks, (C) efficiency with respect to development time, training time, and maximizing reuse (development time—it should not take long to set up the software/algorithms/UI for a new application; training time—the robot should learn new behaviors quickly in terms of wall clock time; training data—the robot should make most efficient use of its training data; maximizing reuse—learning one task should prime the algorithm for learning new tasks, providing a flywheel effect, where overall abilities get better as more skills are learned—i.e., it does not have to learn from scratch every time); (D) ease of use—while the underlying algorithm may be more complicated, it should be easy for people to use and train (without ML/software/hardware knowledge); (E) learning something in simulation should help learning in the real world (ideally, one approach may do all training in simulation, but practically, the goal is to train mostly in an approximate simulation, and then fine-tune quickly in the real world); (G) this does not require a perfect simulated model; and (F) robust to real-world "messiness"—sensor noise, changing calibration, new environments, new robots, changing initial conditions, etc.

The inventors chose to use water bottle flipping as an illustrative example, not as the ultimate goal. This choice adds the following: (a) limited degrees of freedom; (b) does not need continuous/stateful control—the system can issue a command (or set of commands) to the robot without querying the environment with sensors, (c) complicated water bottle physics, (d) fast movement, and (e) it would be hard to manually come up with an accurate and well-shaped reward function.

There are two possible modes of policy learning, "general learning" and "fast interactive ML." The steps of these approaches are summarized first and then described in further detail below, and can be used for the policy training process 300 implemented by the robotic control system 206 described above.

Figure 4:
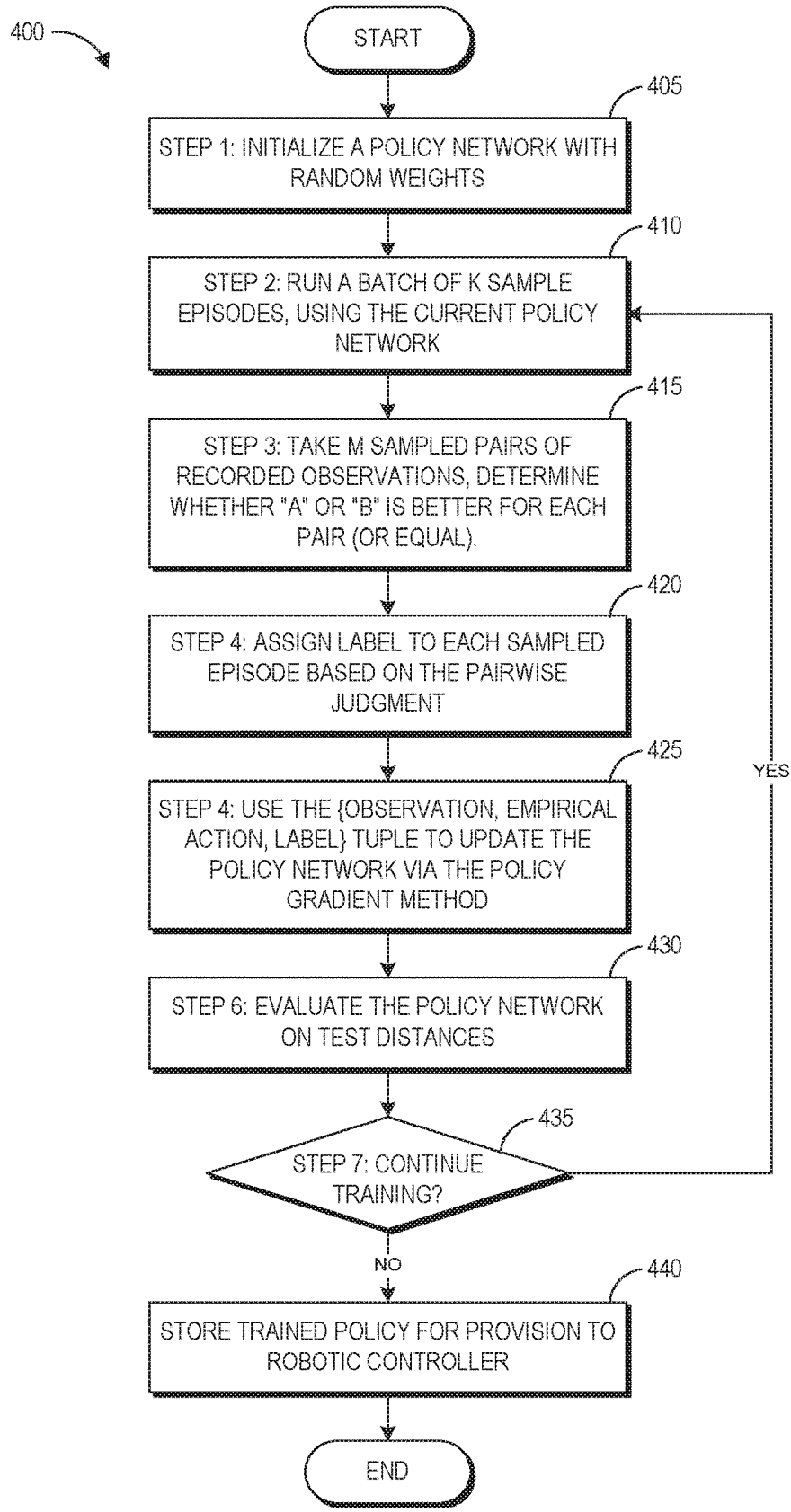
FIG. 4 is a flow diagram of an illustrative artificial intelligence process for training a robotic control policy using the computing system of FIGS. 2A and 2B according to some embodiments

General learning refers to the process for building more complex and robust robotic control policies. In this approach the goal is to not learn too fast, so as to limit overfitting. General learning includes seven steps, as shown by the flowchart of FIG. 4 showing an example process 400 for gradient learning. The process 400 represents another formulation of the process 100 described above.

At block 405, the robotic control system 206 performs step 1 of the general learning process 400. The robotic control system 206 initializes a policy network (e.g., policy network 115) with random weights. The network will take in observation and/or goal vectors, and will output action vectors. With respect to step 1 of general learning, the policy network can be considered as the "workhorse" in the training algorithm, as it determines how the robotic agent will interpret its environment and goals, and produces actions based on that information. The policy can be converted into Gaussian space, and policy network 115 takes the task designation (and optionally system parameters) as inputs and outputs a predicted set of values (the means of Gaussian distribution).

For this use case, the policy network 115 used a multilayer feedforward neural network (here, with an input layer, one hidden layer, and one output layer), with 16-64 hidden units in each layer. This can be varied in other training situations. The input to the network includes a vector of size 1, with a floating point value representing a target distance between 1 meter and 4 meters. The target distance refers to the distance to which the robot would throw the bottle if performing the task successfully. The network outputs a vector of 4 values, in this example representing three joint angles and a time of release. These output values provide the means of independent Gaussian distributions. The reason for the distribution (instead of directly using these action values) is to (a) provide a method for exploration and (b) it is important for the policy gradient approach in continuous domains (as will be discussed later). This example uses an external decay factor on the standard deviations. The means and standard deviations provide the pre-requisites for sampling actions.

At block 410, the robotic control system 206 performs step 2 of the general learning process 400. This can be the training data gathering stage 145 in some embodiments. At step 2, the robotic control system 206 runs a batch of k sample episodes (e.g., virtual or real trials), using the current policy network. With respect to step 2, this uses a "forward pass" through the policy network by which the robotic control system 206 tries a variety of actions in the simulated and/or real world environments. No learning updates happen at this stage as it functions simply for collecting training data. The training can uniformly randomly sample (e.g., k=20) target distances between 1 meter and 4 meters. For each of these sampled target distances, the system 206 obtains a sample action vector as described in step 1, and then sends the translated command to the robot. The robot (simulated or real) will run an episode, and the robotic control system 206 will collect data for later use. Specifically, the robotic control system 206 records: observation—vector (in this case, the target distance), action—vector (these are the sampled actions, not the mean action), environment—diagnostic environment name, and MP4 file—video recording of the episode.

At block 415, the robotic control system 206 performs step 3 of the general learning process 400. This can be used as block 170 of the process 100 in some embodiments. The robotic control system 206 takes m sampled pairs of videos and shows the pairs to a user (or presents them to a trained machine learning evaluator). The user chooses whether video "A" or "B" is better for each pair (or whether the two are equal). The human-provided pairwise judgments help in multiple ways. For example, it may be difficult to specify good behavior, but it is easier to recognize good behavior. In addition, giving a pairwise judgment can be easier than giving an absolute value judgment. Further, quality judgments give a better-shaped reward signal, compared to a sparse reward signal with little gradient. In some embodiments, the human-provided judgments may be supplemented or replaced by an automated machine learning evaluation of task performance.

For this feedback step, the robotic control system 206 can choose the pairs (video A and video B) using k-nearest neighbors algorithm ("k-NN") in the observation space. For example, the robotic control system 206 can implement block 155 of the process 100. The robotic control system 206 can sample the A option uniformly at random from the current batch. Once robotic control system 206 identifies the A sample, it can perform a k-NN search between the A observation and all other observations, and sample randomly from that top K. The resulting episode in the present example is the B video. To illustrate, if video A relates to a target distance=1.7 m, then the potential second videos in the pair would relate to target distances around 1.5 m to 2.0 m. This can be repeated for m pairs to collect a number of data records of 5-tuples: {observation A, action A, observation B, action B, pairwise label}.

The rationale for this sampling is that it can be easier to compare two episodes when the two episodes look similar, and with the vector-represented observations this similarity can be evaluated by the robotic control system 206 as vector similarity. For example, as described above, the network outputs a vector of 4 values, in this example representing three joint angles and a time of release. The robotic control system 206 can compare these vectors to determine the difference in joint positions and release time between observation A and observation B, generating a "change vector" with four values that represent the magnitude of the difference between the values of the vector of observation A and the corresponding values of the vector of observation B (e.g., block 175). The robotic control system 206 can assign a positive reward to the higher-performing observation, generate an update vector using reinforcement learning, and then update the network parameters via a gradient update by weighting the update vector with the change vector. This approach enables the robotic control system 206 to identify where and by how much policy A differed from policy B, and then leverage the feedback saying that policy A caused better performance in order to weight the updates to these areas more heavily. Where policy A and policy B were the same, no update may be applied. This approach logically presumes that the differences between policy A and policy B account for the superior performance of policy A, and so rewards these differences with more heavily weighted updates. This can increase the likelihood that actions that yielded positive rewards will continue to occur. Some embodiments can also assign negative rewards to the policy that was not favored.

In some embodiments, the reinforcement learning update can reflect sigma values relating to the policy performance in order to weight the updates. Sigma refers to the distribution of the action vector, where the distribution becomes wider or smaller based on the sigma of the output. For example, if two episodes are farther from the middle point of the distribution, this can result in the reinforcement learning system implicitly up or down weighting the update. To generate the distribution, the robotic control system 206 can analyze the mean and variance of performance based on values of the policy network output nodes for the trials.

The robotic control system 206 is trying to learn one general policy, but that policy could include different actions under different observations. It would be undesirable to conflate the differences between observations with the difference between policy qualities. For example, if two observations are very different, then that signal could confound the view of the policy.

Consider the following example: In a hypothetical pair, the A target is 1.3 m, and the B target is 3.7 m. Both videos look "okay"—neither is great, neither is terrible with respect to their individual goal distances. If the user tried to say whether A or B was better, the user could implicitly let the target distances impact the quality judgments of the two episodes—maybe throwing longer is implicitly a harder goal. Thus, episode B could "look worse" than A, even if the policy is actually better relative to how close A is to optimal for its own distance. Now, the target distance is a simple example—it is one number. By framing this as a vector similarity problem, it generalizes to images, sounds, and data from sensors—anything for which the robotic control system 206 can learn representations.

At block 420, the robotic control system 206 performs step 4 of the general learning process 400. The robotic control system 206 assigns a label to each sampled episode based on the pairwise judgment provided at block 415. As described above, the pairwise label is an AB choice. To translate this to a numerical value that is usable in the machine learning model, one example could say+1 for the positive episode, and 0 for the negative episode. However, to account for some level of uncertainty in this subjective judgment, the distribution can be softened a little bit—for example the positive episode gets (1—epsilon) reward, and the negative episode gets (epsilon) reward. Each labeled observation can be stored as a 3-tuple in the form {observation, empirical action, label}.

At block 425, the robotic control system 206 performs step 5 of the general learning process 400. The robotic control system 206 uses the {observation, empirical action, label} tuple to update the policy network via the policy gradient method. This is the learning step, the "backward pass" through the policy network to refine its parameters. The policy gradient method operates under the following principle: make good actions more probable and bad actions less probable. More precisely, the robotic control system 206 will adjust policy network parameters such that actions with high empirical returns have higher probability, and actions with low empirical returns have lower probability. Step 5 can be performed according to the update equation of the policy gradient of the machine learning system 218. This equation tells the robotic control system 206 what direction to move (the gradient) to increase expected rewards. In simplest terms, the robotic control system 206 can plug in our data from steps 3 and 4 into this equation, get some list of values, and then add those values to the neural network parameters—this how it performs machine learning. Step 5 can also involve block 180 of the process 100 in order to improve the efficiency of the training process.

Although the present disclosure discusses policy updates via reinforcement learning, this example can be considered more like contextual bandits because there is no closed feedback loop. However, the algorithm used extends to the reinforcement learning domain naturally. The code can be written in a way that expects stateful control, and just happens to have one state per episode.

At block 430, the robotic control system 206 performs step 6 of the general learning process 400. The robotic control system 206 evaluates the policy network on test distances. The training policy includes a lot of noise around the action means. For evaluation, the robotic control system 206 looks at the center of the policy where there is little-to-no noise. One reason for this is to monitor how the policy is generally shifting. Steps 2-6 can involve saving data, model checkpoints, and diagnostic metrics throughout training.

At decision block 435, the robotic control system 206 determines whether to perform step 7 of the general learning process 400. Step 7 involves repeating steps 2-6. Repeating steps 2-6 can optionally involve decaying things like the learning rate, noise standard deviation, etc. To make this determination, the robotic control system 206 determines whether to continue training the policy, for example by comparing current and/or past results using the policy to a success metric as described with respect to FIG. 3. If the robotic control system 206 determines to perform step 7, the process 400 loops back to block 410 to repeat steps 2-6. If not, the process transitions to block 440 to store the trained policy for provision to a robotic controller.

Fast interactive machine learning ("ML") refers to a simplified version done, for example, for real-time demos—it is more akin to parameter search and calibration, and the goal is to learn fast. Fast interactive ML also includes seven steps, though some steps differ from the steps of general learning as described below.

At step 1 of fast interactive ML process, the robotic control system 206 initializes a policy network with random weights (or pre-learned weights). This can be similar to block 405 described above.

At step 2 of fast interactive ML process, the robotic control system 206 takes one sample action from the current policy network, and sets it as option A. This is an adaptation from general learning step 2 (block 415 of the process 400), but uses just one sample—the fast interactive ML process is trying to be as data-efficient as possible and is typically not used for training complex policies, so there might just be a dummy observation. The "A" option will be the "anchor" or "best-yet" option.

At step 3 of fast interactive ML process, the robotic control system 206 takes one sample action from the current policy network, and sets it as option B. This is an adaptation from general learning step 2, but uses just one sample as the "new" or "exploration" option.

At step 4 of fast interactive ML process, the robotic control system 206 compares whether episode A or B was better. This can be performed similarly to block 420 of the process 400 to elicit a pairwise judgement from a user or trained machine learning classifier.

At step 5 of fast interactive ML process, the robotic control system 206 assigns a label to each episode based on the pairwise judgment. This can be performed similarly to block 415 of the process 400.

At step 6 of fast interactive ML process, the robotic control system 206 updates the policy network using the label and policy gradient method. This can be performed similarly to block 425 of the process 400.

At step 7 of fast interactive ML process, the robotic control system 206 stores the best-yet episode as the new option A. The robotic control system 206 will overwrite option A if the new episode is better than the old anchor episode. Thus, with fast interactive ML the robotic control system 206 is always comparing to the "best-yet" observation. This also can cut down the training episodes (in some cases, it cuts them in half), as the robotic control system 206 does not need a fresh A and B, but only need a fresh B option.

At step 8 of fast interactive ML process, the robotic control system 206 repeats steps 3-7. This can continue the training process until the operators are satisfied with performance of the robotic control policy. Some implementations of fast interactive ML can cut out the model saving, logs, and plotting to make it as fast as possible.

Some embodiments can implement a two-network system—a policy network and a reward network. The reward network would learn how to "score" an (observation, action) pair, and the training data for this scoring would be human judgments. The human judgments could be pairwise comparisons, where the robotic control system 206 learns a continuous function that tries preserve ranking seen in the training examples. Benefits of having the second network to model the reward include that it may be easier to learn in value/reward space than in policy space, it allows options besides AB pairwise signals to provide rewards back to the policy network, it opens the door to automating the reward evaluation (e.g. training a computer vision system to automatically evaluate results), and it may be possible to use the same reward network as a signal for different policies. Potential disadvantages of having the second network to model the reward include that it can be harder to normalize (e.g., the policy network learns better if the reward signals are normalized to mean 0 and unit standard deviation), can yield the "moving target" effect from having both the reward network and policy network being updated (thus reducing system stability through an additional layer of variance) and so sampling strategies become even more important, and that the reward network is explicitly higher dimension than the policy network (e.g., the reward network's domain is observations X actions, but the policy network's domain is actions). Another potential drawback is that the dual-network system can have a long "warm-up" period because in the beginning, the robotic control system 206 starts from scratch with two networks instead of one, and it can be fruitless to send reward network signals to the policy network if the reward network is bad. Therefore, the system can require a significant quantity of training data at the beginning to prime the reward network.

Thus, in some implementations, the efficiency and fewer moving parts can lead to choosing the one-network approach. In the long term, or for more complex problems, it may makes sense to try the two-network approach. As another alternative approach, the robotic control system 206 can try a purely reward/value-based approach where it only models the reward network (or a Q network if using states and actions)/

Terminology

Implementations disclosed herein provide systems, methods and apparatus for training and using machine learning models. The disclosed training and prediction models can be implemented in machine learning systems or artificial intelligence systems, including robotic systems performing specific tasks. As used herein, such systems include electronic memory storing computer-executable instructions for performing the described training and/or prediction operations and hardware processors that execute the instructions.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or combinations of electronic hardware and computer software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a general purpose processor device, GPU, a DSP, an ASIC, a FPGA or other programmable logic device, discrete gate or transistor logic, discrete hardware components, or any combination thereof designed to perform the functions described herein. A general purpose processor device can be a microprocessor, but in the alternative, the processor device can be a controller, microcontroller, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the scope of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A method comprising, as implemented by a computing system comprising one or more processors:

running trials of a robotic system performing a task according to a robotic controller programmed to implement a control policy, wherein the task involves interaction between the robotic system and one or more physical objects;
identifying one trial of the trials for a pairwise comparison with one other trial of the trials;
selecting the other trial based at least partly on determining that the other trial is similar to the one trial;
accessing results of the pairwise comparison to determine which of the one trial and the other trial represents a greater degree of success at the task;
identifying differences between the one trial and the other trial; and
using machine learning to learn the control policy at least partly by performing targeted updates to the control policy based on the results of the pairwise comparison and the differences between the one trial and the other trial.

2. The method of claim 1, further comprising eliciting the results of the pairwise comparison from a human user.

3. The method of claim 1, further comprising generating the results of the pairwise comparison using a trained machine learning classifier.

4. The method of claim 1, further comprising:
generating a first vector representing actions of the robotic system during the one trial;
generating a second vector representing actions of the robotic system during the other trial; and
identifying the differences by comparing the first vector to the second vector.

5. The method of claim 4, wherein performing the targeted updates comprises weighting an update from a reinforcement learning system based on location and magnitude of the differences between the first and second vectors.

6. The method of claim 5, further comprising generating the update using the reinforcement learning system based at least partly on the pairwise comparison.

7. The method of claim 1, further comprising:
learning a next iteration of the control policy based on the targeted updates;
performing additional trials using the next iteration of the control policy; and
using machine learning to learn a further iteration of the control policy at least partly by performing additional targeted updates to the control policy based on results of an additional pairwise comparison between two of the additional trials and differences between the two of the additional trials.

8. The method of claim 7, further comprising performing the trials in a simulated environment and performing the additional trials in a real-world environment, wherein the simulated environment models parameters of the real-world environment.

9. The method of claim 1, further comprising outputting a finalized iteration of the control policy to the robotic controller to control the robotic system to perform the task, wherein the task involves physical movement of the robotic system to interact with the one or more physical objects.

10. A system comprising:
a robotic system that performs a task according to a robotic controller programmed to implement a control policy; and
a computing system comprising one or more processors, the computing system programmed with executable instructions to at least:
run trials of the robotic system performing the task using a preliminary version of the control policy;
identify one trial of the trials for a pairwise comparison with one other trial of the trials;
select the other trial using k-nearest neighbors to determine that the other trial is similar to the one trial;
access results of the pairwise comparison to determine which of the one trial and the other trial represents a greater degree of success at the task;
identify how actions of the robotic system differed between the one trial and the other trial;
use machine learning to learn the control policy at least partly by performing targeted updates to the control policy based on the results of the pairwise comparison and how the actions differed; and
output the learned control policy to the robotic controller to control the robotic system to perform the task, wherein controlling the robotic system to perform the task comprises controlling physical movement of the robotic system to interact with one or more physical objects.

11. The system of claim 10, wherein, to run the trials, the computing system is programmed with executable instructions to at least:
generate a first action vector by providing a first target for the task as input to a neural network representing the control policy;
control the robotic system to perform the one trial based on the first action vector;
generate a second action vector by providing a second target for the task as input to the neural network; and
control the robotic system to perform the other trial based on the second action vector.

12. The system of claim 11, wherein, to identify how actions of the robotic system differed between the one trial and the other trial, the computing system is programmed with executable instructions to at least generate a difference vector by subtracting one of the first and second action vectors from the other of the first and second action vectors.

13. The system of claim 12, wherein, to perform the targeted updates to the control policy, the computing system is programmed with executable instructions to at least weight a policy update from a reinforcement learning system by the difference vector.

14. The system of claim 11, wherein, to select the other trial using k-nearest neighbors, the computing system is programmed with executable instructions to at least:
identify a candidate pool of action vectors as a top number or percentage of action vectors corresponding to the trials that are near to the first action vector in a feature space; and
sample the second action vector from the candidate pool.

15. A non-transitory computer-readable medium storing instructions that, when executed by a computing system comprising one or more processors, cause the computing system to perform operations comprising:
running trials of a robotic system performing a task according to a control policy, wherein the task involves movement of the robotic system to interact with one or more objects;
identifying one trial of the trials for a pairwise comparison with one other trial of the trials;
selecting the other trial based at least partly on determining that the other trial is similar to the one trial;
accessing results of the pairwise comparison to determine which of the one trial and the other trial represents a greater degree of success at the task;
identifying differences between the one trial and the other trial; and performing targeted updates to the control policy based on the results of the pairwise comparison and the differences between the one trial and the other trial.

16. The non-transitory computer-readable medium of claim 15, the operations further comprising:
   generating a first vector representing actions of the robotic system during the one trial;
   generating a second vector representing actions of the robotic system during the other trial; and
   identifying the differences by comparing the first vector to the second vector.

17. The non-transitory computer-readable medium of claim 16, wherein performing the targeted updates comprises weighting an update from a reinforcement learning system based on location and magnitude of the differences between the first and second vectors.

18. The non-transitory computer-readable medium of claim 17, the operations further comprising generating the update using the reinforcement learning system based at least partly on the pairwise comparison.

19. The non-transitory computer-readable medium of claim 15, the operations further comprising:
   learning a next iteration of the control policy based on the targeted updates;
   performing additional trials using the next iteration of the control policy; and
   using machine learning to learn a further iteration of the control policy at least partly by performing additional targeted updates to the control policy based on results of an additional pairwise comparison between two of the additional trials and differences between the two of the additional trials.

20. The non-transitory computer-readable medium of claim 19, the operations further comprising performing the trials in a simulated environment and performing the additional trials in a real-world environment, wherein the simulated environment models parameters of the real-world environment.

21. The non-transitory computer-readable medium of claim 15, the operations further comprising outputting a finalized iteration of the control policy to a robotic controller configured to control the robotic system to perform the task, wherein the task involves physical movement of the robotic system to interact with one or more physical objects.

* * * * *